(12) United States Patent
Buosi et al.

(10) Patent No.: US 10,001,319 B2
(45) Date of Patent: Jun. 19, 2018

(54) METHOD FOR MANUFACTURING A REFRIGERATING APPARATUS

(71) Applicant: Electrolux Appliances Aktiebolag, Stockholm (SE)

(72) Inventors: Augusto Buosi, Porcia (IT); Sergio Grotto, Porcia (IT)

(73) Assignee: Electrolux Appliances Aktiebolag, Stockholm (SE)

( * ) Notice: Subject to any disclaimer, the term of this patent is extended or adjusted under 35 U.S.C. 154(b) by 342 days.

(21) Appl. No.: 14/901,856

(22) PCT Filed: Jul. 14, 2014

(86) PCT No.: PCT/EP2014/065031
§ 371 (c)(1),
(2) Date: Dec. 29, 2015

(87) PCT Pub. No.: WO2015/010935
PCT Pub. Date: Jan. 29, 2015

(65) Prior Publication Data
US 2016/0370101 A1 Dec. 22, 2016

(30) Foreign Application Priority Data
Jul. 25, 2013 (EP) .................. 13177996

(51) Int. Cl.
*F25D 23/06* (2006.01)
*B23P 15/26* (2006.01)
(Continued)

(52) U.S. Cl.
CPC ........... *F25D 23/061* (2013.01); *B23P 15/26* (2013.01); *F25D 23/066* (2013.01); *B29C 51/10* (2013.01);
(Continued)

(58) Field of Classification Search
CPC .............. B23P 15/26; B29C 2791/007; B29C 2791/006; B29C 51/10; B29C 45/006;
(Continued)

(56) References Cited

U.S. PATENT DOCUMENTS 2,732,272 A * 1/1956 Mann .................... F25D 23/025
220/592.06
3,280,583 A * 10/1966 Jones .................... F25D 17/065
220/592.1
(Continued)

FOREIGN PATENT DOCUMENTS

DE 20 2006 013 232 U1 10/2006
DE 10 2010 028 527 A1 11/2011
(Continued)

OTHER PUBLICATIONS

International Search Report issued in Application No. PCT/EP2014/065031 dated Sep. 17, 2014.
(Continued)

*Primary Examiner* — Sarang Afzali
(74) *Attorney, Agent, or Firm* — Pearne & Gordon LLP

(57) ABSTRACT

A method for manufacturing a refrigerating apparatus includes providing an inner liner defining a refrigerator compartment for storing goods to be cooled and a freezer compartment for storing goods to be frozen, the inner liner being provided as a one-piece component part. In one solution, the step of providing the inner liner includes forming a freezer delimiting shell in a precursor element of the inner liner, providing an evaporator portion around the freezer delimiting shell, and forming a refrigerator delimiting shell in the precursor element adjacent to the freezer delimiting shell with the evaporator portion.

13 Claims, 3 Drawing Sheets

(51) Int. Cl.
 *F25D 11/02* (2006.01)
 *B29L 31/00* (2006.01)
 *B29C 51/10* (2006.01)
(52) U.S. Cl.
 CPC .. *B29C 2791/006* (2013.01); *B29C 2791/007* (2013.01); *B29L 2031/7622* (2013.01); *F25D 11/02* (2013.01); *Y10T 29/49359* (2015.01)
(58) Field of Classification Search
 CPC ........... B29L 2031/7622; F25D 23/061; F25D 23/066; F25D 11/02
 See application file for complete search history.

(56) References Cited

U.S. PATENT DOCUMENTS

| | | | | |
|---|---|---|---|---|
| 3,862,880 A | * | 1/1975 | Feldman | ................ B32B 27/00 428/319.9 |
| 3,984,223 A | * | 10/1976 | Whistler, Jr. | ........... F25D 21/04 62/277 |
| 2008/0264096 A1 | * | 10/2008 | Jendrusch | ............... F25D 11/02 62/441 |

FOREIGN PATENT DOCUMENTS

| | | |
|---|---|---|
| EP | 1 831 625 | 9/2007 |
| WO | 2006/069783 A1 | 7/2006 |

OTHER PUBLICATIONS

Written Opinion issued in Application No. PCT/EP2014/065031 dated Sep. 17, 2014.

\* cited by examiner

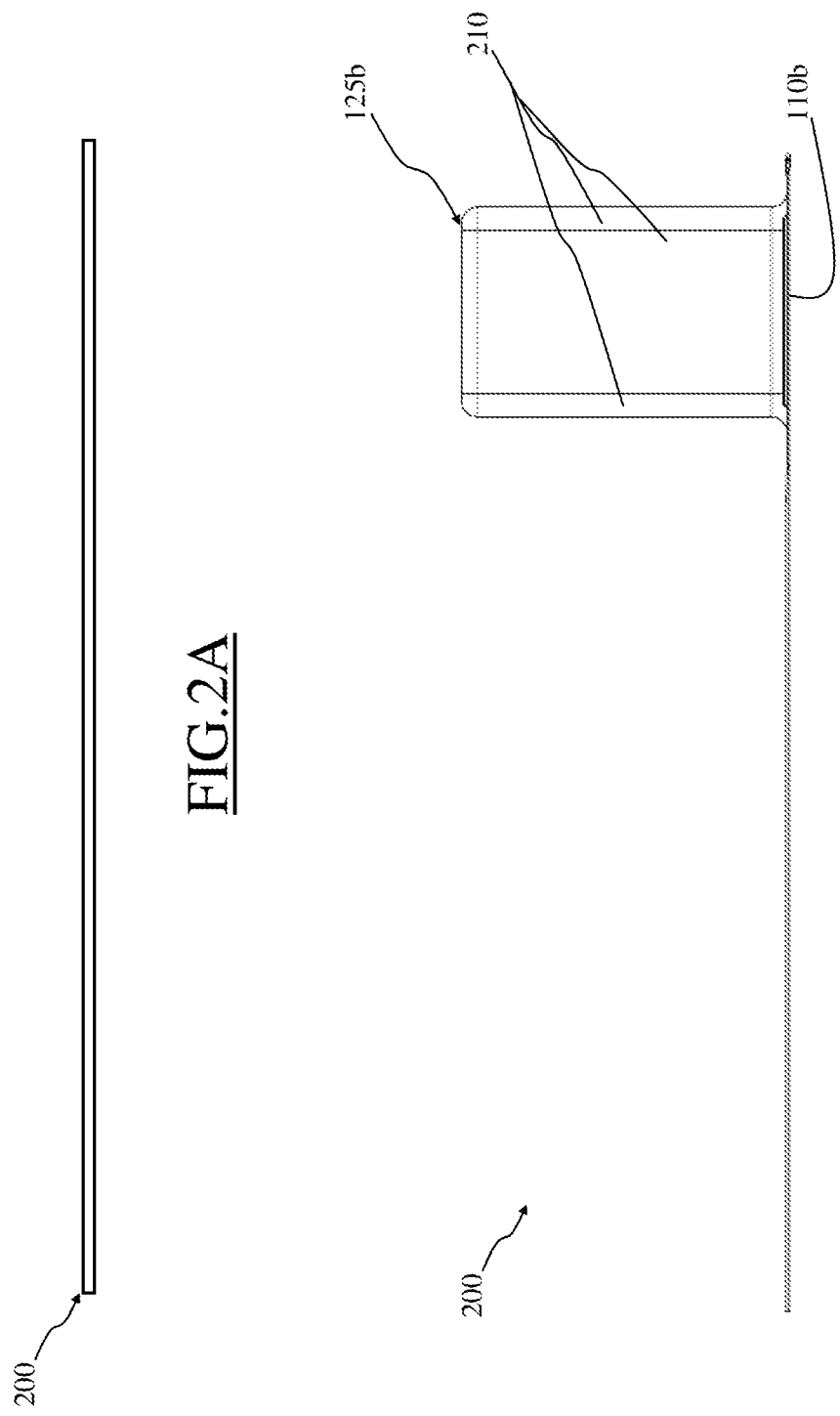

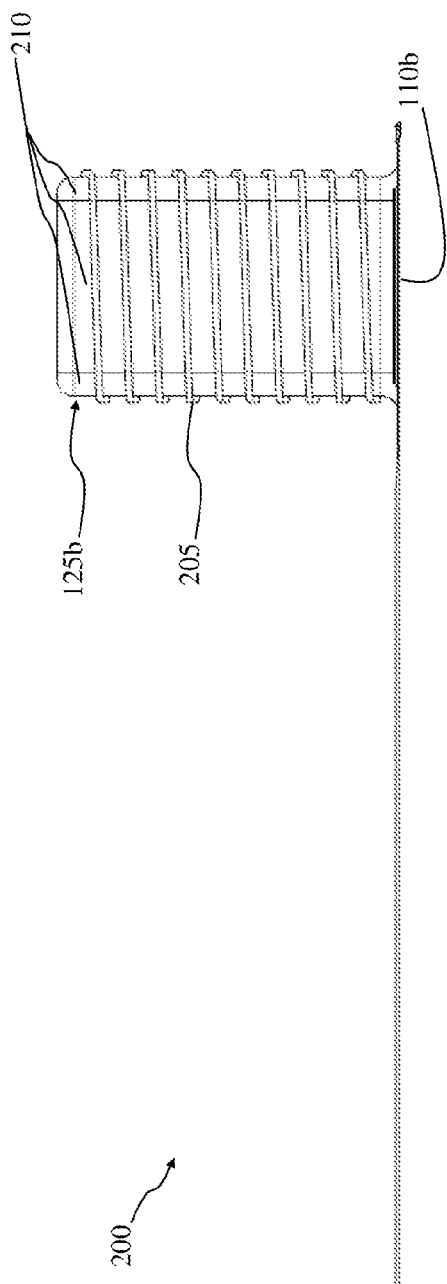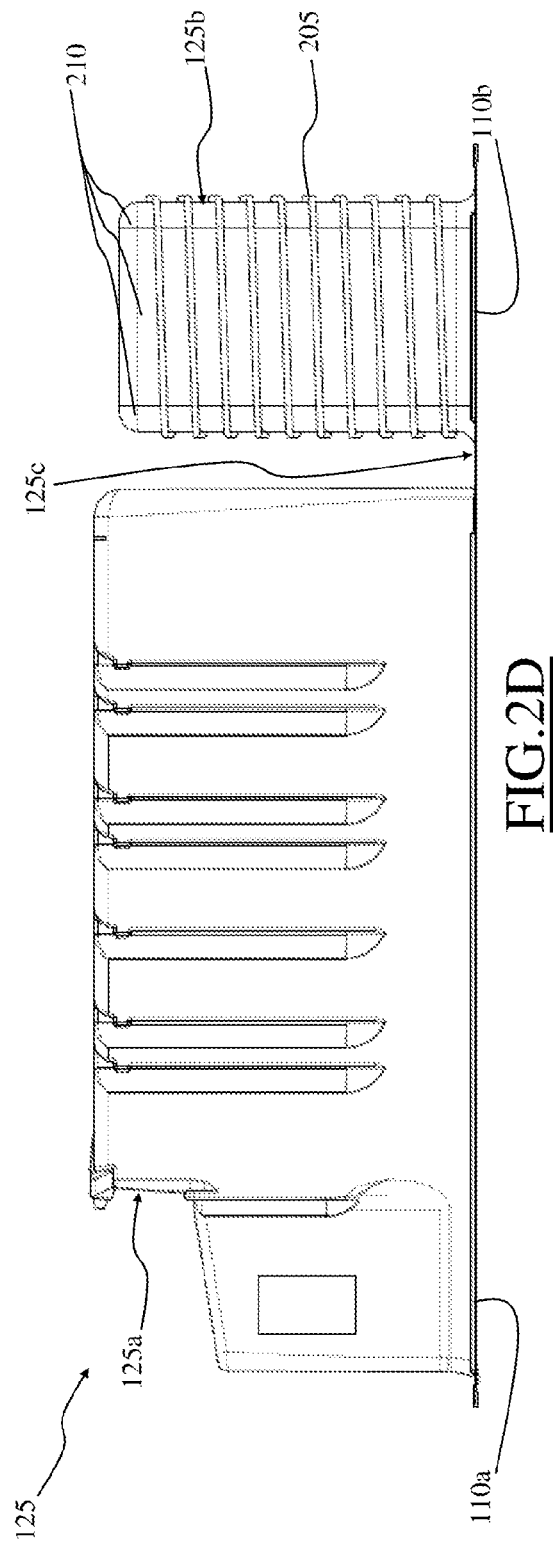

METHOD FOR MANUFACTURING A REFRIGERATING APPARATUS

The present invention relates to refrigerating apparatuses comprising a freezer compartment. In more detail, the present invention regards refrigerating apparatuses in which a refrigerator compartment and the freezer compartment are defined by a same inner liner.

A household and/or professional refrigerating apparatus typically comprises a refrigerator compartment adapted to maintain goods stored therein at a cooling temperature (e.g., selectable in a temperatures range from 1° to 10° C.), and a freezer compartment adapted to maintain goods stored therein at a freezing temperature (e.g., selectable in a temperatures range from −16° to −28° C.). Typically, the freezer compartment is used for storing goods for time periods longer than in the refrigerator compartment.

Refrigerating apparatuses having the freezer compartment located above or below the refrigerator compartment, also denoted as "combi-top" or "combi-bottom" refrigerators in the art, respectively, require a quite long and complex manufacturing procedure. In particular, a refrigerating apparatus of this kind substantially comprises an outer cabinet with a front aperture allowing access to the refrigerator compartment and to the freezer compartment. Both the refrigerator compartment and the freezer compartment are defined by a front part of an inner liner, which is connected to the cabinet and also separates both compartments from operating elements (e.g., a refrigerating system, an electronic control unit, and thermal insulating members) of the refrigerating apparatus provided between the cabinet and a rear part of the inner liner. The refrigerating apparatus may comprise one door for closing the front aperture and, therefore, both refrigerating and freezing compartments, or alternatively two doors one for closing a portion of the front aperture in correspondence of the refrigerator compartment and one for closing a portion of the front aperture in correspondence of the freezer compartment.

The inner liner typically comprises a refrigerator part, for example a shell of polymeric material (e.g., shaped through a thermoforming process) defining the whole refrigerator compartment, a freezer frame part connectable to the refrigerator inner liner (e.g., in an upper portion thereof, with respect to the final operating position), a freezer cell part connectable to the freezer frame part, and a cover element part connectable to the freezer cell part for delimiting a rear portion of the freezer compartment.

Such a complexity in the inner liner structure is due to the fact that, in order to obtain a high-efficiency freezing compartment, a freezer evaporator portion (e.g., a pipe) of the refrigerating system is provided in such a way to surround the freezer compartment, achieving an even heat transfer in the freezer compartment. For example, an evaporator pipe is usually wound around the freezer cell part (obtaining a so-called "four-star" evaporator arrangement). The manufacturing of such inner liner requires several steps to be performed in order to form each one of the parts thereof and for assembling such parts together. Thus, the manufacturing of the refrigerating apparatus is a high time-consuming task.

The European patent EP 1831625 discloses a refrigerator and freezer unit that has a throughgoing inner container, which forms a freezer compartment trough and a chilled goods trough which are integrally connected to one another in a flexurally rigid manner without any joining line or kinking edge, and an evaporator seated on the freezer compartment trough. Flexurally rigid manner means that the compartment troughs cannot be bent away or kinked away to widen a gap therebetween for the purpose of an evaporator installation. A wound box evaporator which surrounds the freezer compartment trough peripherally on four sides is provided as the evaporator. The wound box evaporator is seated on the freezer compartment trough in a light press-fit so that a full contact is achieved between the freezer compartment trough and the winding coils of the evaporator seated thereon in a shape-matched manner.

The Applicant has perceived that the coupling operation of the wound box evaporator with the freezer compartment trough is a complex task, which has to be carried out with particular care. Particularly, the small gap between the two compartment troughs makes it difficult a technician work, or requires a high precision placement tool, in order to place the wound box evaporator in the operating position; moreover, the structural weakness of the pipe comprised in the wound box evaporator requires particular finesse for avoiding damages thereto.

The Applicant has tackled the problem of devising a satisfactory solution able to provide a method for manufacturing a refrigerating apparatus with a inner liner manufactured as a one-piece component part without incurring in, or at least attenuating, the prior art drawbacks The Applicant has found that by applying an approach comprising at least two distinct forming steps in the making of a polymeric inner liner, interspersed by a freezer evaporation portion mounting step, it is possible to obtain a refrigerating apparatus with a one-piece inner liner in a fast and reliable way.

One aspect of the present invention proposes a method for manufacturing a refrigerating apparatus. The method comprising the step of providing an inner liner adapted to define a refrigerator compartment for storing goods to be cooled and a freezer compartment for storing goods to be frozen, the inner liner being provided as a one-piece component part. In a solution according to an embodiment of the invention, the step of providing the inner liner comprises forming a freezer delimiting shell in a precursor element of the inner liner, providing an evaporator portion around the freezer delimiting shell, and forming a refrigerator delimiting shell in the precursor element adjacent to the freezer delimiting shell with the evaporator portion.

In an advantageous embodiment of the invention, the precursor element is a plate of polymeric material.

According to an embodiment of the present invention, the precursor element is a plate of polystyrene.

In an advantageous embodiment of the invention, forming the freezer delimiting shell comprises thermoforming the freezer delimiting shell, and forming the refrigerator delimiting shell comprises thermoforming the refrigerator delimiting shell, separately from the thermoforming of the freezer delimiting shell.

According to an embodiment of the present invention, the evaporator portion comprises a pipe, and providing an evaporator portion comprises winding the pipe around outer sides of the freezer delimiting shell opposite to the freezer compartment.

In an advantageous embodiment of the invention, the pipe around outer sides of the freezer delimiting shell comprises wrapping the pipe around the outer sides of the freezer delimiting shell maintained in a stationary position.

According to an embodiment of the present invention, winding the pipe around outer sides of the freezer delimiting shell comprises rotating the precursor element in order to wrap the pipe around outer sides of the freezer delimiting shell.

In an advantageous embodiment of the invention, winding the pipe around outer sides of the freezer delimiting shell comprises coiling the metal pipe with turns of the coiled pipe evenly spaced one another.

According to an embodiment of the present invention, forming a freezer delimiting shell comprises providing one or more connection elements protruding from the outer sides, the one or more connection elements being adapted to connect a metal pipe portion to the outer side and the one or more connection elements being formed as one-piece component part with the freezer delimiting shell.

In an advantageous embodiment of the invention, providing one or more connection elements comprises providing the one or more connection elements adapted to snap-fit with the metal pipe portion.

According to an embodiment of the present invention, providing one or more connection elements comprises providing a groove on the outer sides of the freezer delimiting shell, the groove being adapted to house at least partly the pipe.

In an advantageous embodiment of the invention, the method further comprises providing an interposing element between the outer sides of the freezer delimiting shell and the evaporator portion.

According to an embodiment of the present invention, providing an interposing element comprises providing a bi-adhesive film or tape, or an adhesive paste between the outer sides of the freezer delimiting shell and the evaporator portion.

In an advantageous embodiment of the invention, providing an interposing element comprises providing a sheet of thermally conductive material between the outer sides of the freezer delimiting shell and the evaporator portion.

According to an embodiment of the present invention, the method further comprising the step of providing a single door element adapted to seal both the refrigerator compartment and the freezer compartment.

Another aspect according to the present invention proposes a refrigerating apparatus manufactured with the method described above.

These and others features and advantages of the solution according to the present invention will be better understood by reading the following detailed description of some embodiments thereof, provided merely by way of exemplary and non-limitative examples, to be read in conjunction with the attached drawings, wherein:

FIG. 2A is a schematic side view of a precursor element of an inner liner;

FIG. 2B is a schematic side view of the precursor element of FIG. 2A after a first forming step according to an embodiment of the invention;

FIG. 2C is a schematic side view of the precursor element of FIG. 2B after a mounting step of an evaporator portion thereon, according to an embodiment of the invention; and FIG. 2D is a schematic side view of the inner liner obtained from the precursor element of FIG. 2C according to an embodiment of the invention.

Figure 1:
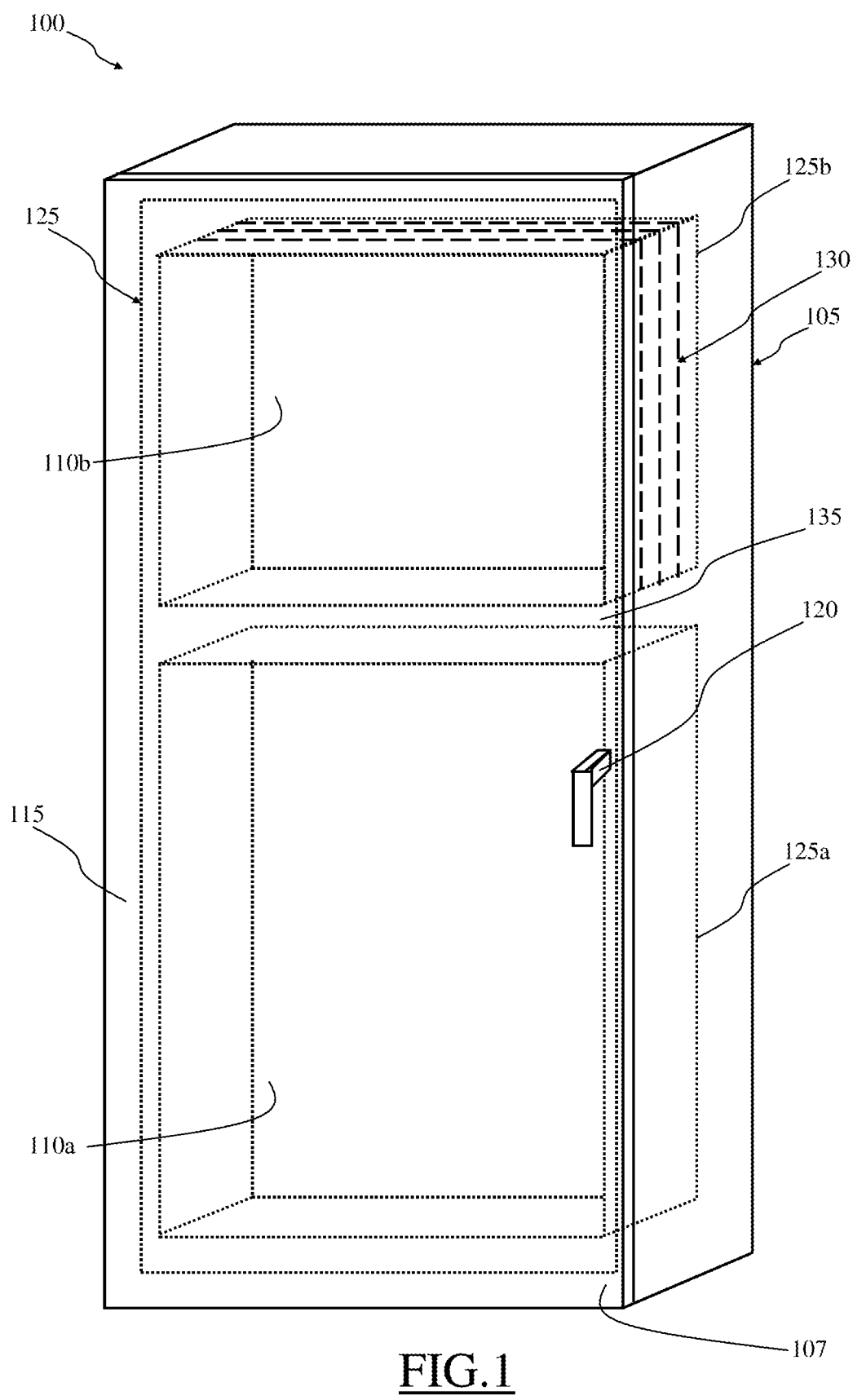
FIG. 1 is a schematic isometric view of a refrigerating apparatus that can be manufactured with a method according to an embodiment of the invention.

With reference to the drawings, FIG. 1 is a schematic isometric view of a refrigerating apparatus 100 that can be manufactured with a method according to an embodiment of the invention.

In the example at issue, the refrigerating apparatus 100 is of a stand-alone type. Anyway, it should be apparent from the following description that refrigerating apparatuses of built-in type may also benefit from the solution according to the present invention.

The refrigerating apparatus 100 comprises a cabinet 105 preferably substantially parallelepiped-shaped, which substantially encloses all the other components of the refrigerating apparatus 100. In some embodiments according to the present invention, a rear part (not shown) may comprise an opening adapted to expose a portion (e.g., a condenser portion) of a refrigerating system (not shown).

The cabinet 105 comprises a front aperture 107 allowing access to a refrigerator compartment 110a and to a freezer compartment 110b adapted to store goods to be refrigerated or frozen, respectively.

The refrigerating apparatus 100 also comprises a door 115, which is provided for closing the front aperture 107 in a sealing manner, in order to thermally insulate and seal the compartments 110a and 110b from the outside environment. The door 115 may advantageously be provided with a grasping portion, such as a handle 120 adapted to be grasped by a user in order to simplify the opening and closing of the door 115. In other embodiments according to the present invention, the refrigerating apparatus 100 may be provided with two doors, each one adapted to seal and thermally insulate a respective portion of the front aperture 107 in correspondence of the refrigerator compartment 110a and the freezer compartment 110b, respectively.

In the solution according to an embodiment of the present invention, the refrigerator compartment 110a and the freezer compartment 110b are defined by a refrigerator delimiting shell 125a (schematized by a dotted line in FIG. 1) and by a freezer delimiting shell 125b (schematized by a dotted line in FIG. 1), respectively, comprised in an inner liner 125 (schematized by a dotted line in FIG. 1). Particularly, the inner liner 125 is formed as a one-piece component part (as will be described in the following), and is preferably made of a plastic polymer (e.g., such as polystyrene, PS). With such one-piece construction of the inner liner 125, an intermediate portion 125c, which is provided between the refrigerator compartment 110a and the freezer compartment 110b, is continuously, seamlessly joining the two compartments 110a and 110b; thus the overall aesthetic appearance of the refrigerating apparatus 100 results improved.

Such an inner liner 125 is preferably adapted to be mounted onto a frame (not shown) of the refrigerating apparatus 100, which is provided for supporting the various component parts thereof (such as the cabinet 105, the refrigerating system, etc.).

Moreover, an evaporator portion 130 (schematized by a dashed line in FIG. 1) of the refrigerating system is provided around the freezer delimiting shell 125b (in a so-called "four-star" structure). For example, the evaporator portion 130 may comprise a pipe made of a good thermal conductor (e.g., metal such as aluminum or copper), which is bent in order to enclose the surfaces of the inner liner 125 that define sidewalls of the freezer compartment 110b, in such a way to coil around the latter. With such an arrangement of the evaporation portion 130, it is possible attaining a uniform freezing of the goods inside the freezer compartment 110b.

Considering jointly FIGS. 2A-2D, which show forming stages of the inner liner 125, starting from a precursor element 200, it will now be described a method for forming the inner liner 125 with the evaporator portion 130 according to an embodiment of the present invention.

Starting from FIG. 2A, which is a schematic side view of the precursor element 200, for example a plate 200 of a suitable material that is substantially a sheet preferably with the same size, in plan-view, desired for the inner liner 125, but with a mass adapted to form the walls defining the compartments. Preferably, the plate 200 is made of polymeric material adapted to be subjected to a thermoforming process (e.g., polystyrene PS).

The plate 200 is firstly handled for forming the freezer delimiting shell 125b. Preferably, the plate 200 is subjected to a thermoforming process; for example, the heated plate 200 is draped over a mold (not shown). As an alternative or as an addition, vacuum or pressurized air may be used in the forming process. For example, the mold may be used with pressurized air blown therein in order to help the heated plate 200 fitting the mold.

After the first forming step is performed, the freezer delimiting shell 125b is completely formed (as shown in FIG. 2B), in such a way that the freezer compartment 110b is completely defined as well (i.e., no additional component parts are required).

Subsequently, the evaporator portion 130 is mounted to the freezer delimiting shell 125b (as shown in FIG. 2C). Preferably, a pipe 205 made of a thermal conductor material such as a metal (e.g., an aluminum or copper pipe) is wound to outer sidewalls 210 of the freezer delimiting shell 125b, while the latter is maintained stationary. For example, a suitable machinery (not shown in the figures) may be used, which is adapted to bend the pipe 205 along intersection edges between couples of the sidewalls 210 while the plate 200 is fastened to a workbench (e.g., by a vise element). Advantageously, it is possible to obtain a coil with all turns of the coiled pipe 205 evenly spaced one another at a predetermined distance along the sidewalls 210 of the freezer delimiting shell 125b.

Alternatively, the plate 200 may be rotated around an axis transversal to the plate 200 and preferably centered on the freezer delimiting shell 125b. In this alternative, the metal pipe 205 is wrapped to the sidewalls 210 of the freezer delimiting shell 125b thanks to the rotation thereof.

At the end of the winding stage just described, the evaporator portion 130 and the freezer delimiting shell 125b result coupled together, without requiring any other manufacturing step.

It should understood that the task of mounting the evaporator portion 130 to the freezer delimiting shell 125b may also be manually performed by a technician, thus without the need for providing any machinery.

Advantageously, although not limitatively, a plurality of connection elements may be provided on the outer side of the sidewalls 210, for connecting the latter with the pipe 205 in a more controlled manner. For example, "C"-shaped lugs (not shown in the drawings) may be provided on the sidewalls 210 at predetermined positions during the thermoforming process of the freezer delimiting shell 125b (i.e., integral with the latter) in order to define a track for the pipe 205. During the winding of the pipe 205, portions of the latter may be snap-fitted with such "C"-shaped lugs. In this way, it is possible to precisely control the position of the windings on the sidewalls 210 and to prevent, or at least reduce, movements of the evaporator portion 130 from the working position during the refrigerating apparatus 100 manufacturing and life.

Alternatively or in addition, a helix-like groove (not shown in the drawings) may be provided on the sidewalls 210 (e.g., during the thermoforming process). The groove may be advantageously shaped in such a way to house at least partially the pipe 205 and to define a (further) track for the latter during its winding. With such a groove, it is again possible to precisely control the position of the windings on the sidewalls 210 and to prevent, or at least reduce, movements of the evaporator portion 130 from the working position during the manufacturing and life of the refrigerating apparatus 100.

As another alternative or addition, an interposing element such as a bi-adhesive film or tape, or an adhesive paste may be attached to the sidewalls 210 in order to affix the pipe 205 to the sidewalls 210 during (or after) the winding thereof.

Advantageously, in order to enhance a heat exchange between the evaporator portion 130 and the freezer delimiting shell 125b (and therefore with the freezer compartment 110b) one or more sheet of a thermally conductive material (not shown, such as aluminum foils) may additionally be used as interposing element, by being coupled with the sidewalls 210 before the winding of the pipe 205 thereon. In this way, it is possible to distribute more evenly the heat exchange over the freezer delimiting shell 125b, which leads to a more uniform freezing action on the goods stored in the freezer compartment 110b.

Then the plate 200 is subjected to another forming procedure in order to shape the refrigerator delimiting shell 125a. For example, another thermoforming process may be applied to the plate 200, similar to the one described in the forming of the freezer delimiting shell 125b. In other words, the plate 200 is heated again and draped over a further mold (not shown). Again, as an alternative or as an addition, vacuum or pressurized air may be used in the forming process. For example, the mold may be used with pressurized air blown therein in order to help the heated plate 200 fitting the mold.

At the end of such further forming process the whole inner liner 125 is obtained (as shown in FIG. 2D) with the evaporator portion 130 already in operating position (i.e., ready to be connected to the remaining portion of the refrigerating system).

As can be promptly understood, thanks to the method herein described it is possible to obtain the inner liner 125 as a single component part from a single plate 200 of polymeric material and, at the same time, it is possible to easily provide the evaporator portion 130 on the freezer delimiting shell 125b without risk of compromising any one between the former and the latter. For example, compression of one or more portions of a pre-coiled pipe, due to insertion thereof on the freezer delimiting shell 125b, which may lead to an uneven spacing between pipe turns or deformations thereof, are completely avoided.

Moreover, the method according to an embodiment of the present invention allows obtaining the inner liner 125 with the evaporator portion 130 with a reduced number of steps compared to the known solution in which an inner liner comprising several component parts is implemented; thus leading to a higher manufacturing yield.

As it is clear to a person skilled in the art, the present invention can be applied to both combi-top and combi-bottom refrigerators.

What is claimed is:

1. A method for manufacturing a refrigerating apparatus (100) comprising the step of:
   providing an inner liner (125) adapted to define a refrigerator compartment (110a) for storing goods to be cooled and a freezer compartment (110b) for storing goods to be frozen, the inner liner being provided as a one-piece component part, wherein the step of providing the inner liner comprises:
   forming a freezer delimiting shell (125b) in a precursor element (200) of the inner liner (125), providing an evaporator portion (130) around the freezer delimiting shell (125b), and forming a refrigerator delimiting shell (125a) in the precursor element (200) adjacent to the freezer delimiting shell (125b) with the evaporator portion (130), wherein the evaporator portion (130) comprises a pipe (205), and providing an evaporator portion (130) comprises winding the pipe (205) around outer sides (210) of the freezer delimiting shell (125b) opposite to the freezer compartment (110b) before forming the refrigerator delimiting shell (125a).

2. The method according to claim 1, wherein the precursor element (200) is a plate of polymeric material.

3. The method according to claim 2, wherein the precursor element (200) is a plate of polystyrene.

4. The method according to claim 2, wherein forming the freezer delimiting shell (125b) comprises thermoforming the freezer delimiting shell (125b), and forming the refrigerator delimiting shell (125a) comprises thermoforming the refrigerator delimiting shell (125a), separately from the thermoforming of the freezer delimiting shell (125b).

5. The method according to claim 1, wherein winding the pipe (205) around outer sides (210) of the freezer delimiting shell (125b) comprises wrapping the pipe (205) around the outer sides (210) of the freezer delimiting shell (125b) maintained in a stationary position.

6. The method according to claim 1, wherein winding the pipe (205) around outer sides (210) of the freezer delimiting shell (125b) comprises rotating the precursor element (200) in order to wrap the pipe (205) around outer sides (210) of the freezer delimiting shell (125b).

7. The method according to claim 1, wherein winding the pipe (205) around outer sides (210) of the freezer delimiting shell (125b) comprises coiling the pipe (205) with turns of the coiled pipe (205) evenly spaced one another.

8. The method according to claim 1, wherein forming a freezer delimiting shell (125b) comprises providing one or more connection elements protruding from the outer sides (210), the one or more connection elements being adapted to connect a portion of the pipe (205) to the outer side (210) and the one or more connection elements being formed as one-piece component part with the freezer delimiting shell (125b).

9. The method according to claim 8, wherein providing one or more connection elements comprises providing the one or more connection elements adapted to snap-fit with the portion of the pipe (205).

10. The method according to claim 8, wherein providing one or more connection elements comprises providing a groove on the outer sides (210) of the freezer delimiting shell (125b), the groove being adapted to house at least partly the pipe (205).

11. The method according to claim 1, further comprising providing an interposing element between the outer sides (210) of the freezer delimiting shell (125b) and the evaporator portion (130).

12. The method according to claim 11, wherein providing an interposing element comprises providing a bi-adhesive film or tape, or an adhesive paste between the outer sides (210) of the freezer delimiting shell (125b) and the evaporator portion (130).

13. The method according to claim 11, wherein providing an interposing element comprises providing a sheet of thermally conductive material between the outer sides (210) of the freezer delimiting shell (125b) and the evaporator portion (130).

\* \* \* \* \*